(12) United States Patent
Tamai et al.

(10) Patent No.: US 12,498,390 B2
(45) Date of Patent: Dec. 16, 2025

(54) PIPETTE DEVICE AND ANALYSIS DEVICE

(71) Applicant: Muscle Corporation, Osaka (JP)

(72) Inventors: Hirofumi Tamai, Osaka (JP); Hiroshi Oku, Osaka (JP); Yuki Okabe, Osaka (JP)

(73) Assignee: Muscle Corporation, Osaka (JP)

( * ) Notice: Subject to any disclaimer, the term of this patent is extended or adjusted under 35 U.S.C. 154(b) by 644 days.

(21) Appl. No.: 17/907,292

(22) PCT Filed: Apr. 6, 2021

(86) PCT No.: PCT/JP2021/014664
§ 371 (c)(1),
(2) Date: Sep. 26, 2022

(87) PCT Pub. No.: WO2021/220739
PCT Pub. Date: Nov. 4, 2021

(65) Prior Publication Data
US 2023/0111674 A1    Apr. 13, 2023

(30) Foreign Application Priority Data

Apr. 28, 2020   (JP) .................................. 2020-079836

(51) Int. Cl.
*G01N 35/10*    (2006.01)
(52) U.S. Cl.
CPC .  *G01N 35/1009* (2013.01); *G01N 2035/1025* (2013.01); *G01N 2035/103* (2013.01)
(58) Field of Classification Search
None
See application file for complete search history.

(56) References Cited

U.S. PATENT DOCUMENTS

| | | | |
|---|---|---|---|
| 4,563,175 A | * | 1/1986 | LaFond ............... A61M 5/1456 604/246 |
| 2004/0156748 A1 | | 8/2004 | Yamakawa et al. |
| 2016/0202246 A1 | | 7/2016 | Tong et al. |

FOREIGN PATENT DOCUMENTS

| | | |
|---|---|---|
| JP | S5832466 U | 3/1983 |
| JP | H0894640 A | 4/1996 |

(Continued)

OTHER PUBLICATIONS

International Search Report for Application No. PCT/JP2021/014664, issued Jun. 21, 2021 (3 pages).

*Primary Examiner* — P. Kathryn Wright
(74) *Attorney, Agent, or Firm* — Fox Rothschild LLP

(57) ABSTRACT

Provided is a pipette device that achieves both suction and discharge of a large amount of fluid and high-precision discharge of a minute amount of fluid. The pipette device includes: a first syringe 30 that is capable of suctioning fluid and is capable of discharging fluid with a predetermined discharge precision; a second syringe 40 that is capable of suctioning fluid and is capable of discharging fluid with a higher precision than the first syringe; a nozzle 70 provided in common to the first syringe 30 and the second syringe 40; a flow path 60 that causes the first syringe 30 and the second syringe 40 to be in communication with each other, and is in communication with the nozzle 70; and driving units 80, 90 configured to drive the first syringe 30 and the second syringe 40 such that the first syringe 30 and the second syringe 40 suction and discharge fluid from the nozzle 70 individually or in cooperation with each other.

1 Claim, 10 Drawing Sheets

(56) References Cited

FOREIGN PATENT DOCUMENTS

| JP | 2004239697 A | 8/2004 |
|----|--------------|--------|
| JP | 2011-163771 A | 8/2011 |

* cited by examiner

PIPETTE DEVICE AND ANALYSIS DEVICE

CROSS-REFERENCE TO RELATED APPLICATIONS

This application is a U.S. national phase application under 35 U.S.C. § 371 of International Patent Application No. PCT/JP2021/014664 filed Apr. 6, 2021, which claims the benefit of priority to Japanese Patent Application No. 2020-079836 filed Apr. 28, 2020, the disclosures of which are hereby incorporated by reference herein in their entireties.

TECHNICAL FIELD

The present invention relates to a pipette device for suctioning and discharging a fluid such as a test solution, and an analysis device including a pipette device.

BACKGROUND ART

Conventionally, a pipette device has been known which suctions a fluid such as a test solution to be used for a test or inspection from a container and discharges the suctioned test solution or the like in a predetermined amount to another container or the like (e.g., a cuvette) (e.g., see Patent Document 1).

The pipette device includes a syringe and a driving device, and the syringe has a syringe barrel and a plunger. The plunger is inserted inside the syringe barrel and can move forward and backward with respect to the syringe barrel. A nozzle is joined to the syringe barrel, and a disposable tip is connected to the nozzle. Due to the driving device moving the plunger forward and backward with respect to the syringe barrel, the test solution is suctioned from the container into the disposable tip, and the suctioned test solution is discharged to the cuvette.

CITATION LIST

Patent Documents

Patent Document 1: International Publication No. 2019/193404

SUMMARY OF INVENTION

Technical Problem

Incidentally, the fluid suction capacity of the pipette device is determined according to the volume of the syringe, and the volume of the syringe is proportional to the product of the cross-sectional area of the syringe barrel and the movement amount of the plunger. It is conceivable to increase the cross-sectional area of the syringe barrel in order to increase the fluid suction capacity.

On the other hand, the resolution (dispensing precision) of the fluid discharge amount of the pipette device is related to the cross-sectional area of the syringe barrel and control of the movement amount of the plunger. For this reason, when the cross-sectional area of the syringe barrel is increased, it is necessary to control the movement amount of the plunger more precisely in order to discharge the fluid by a minute amount.

However, in order to precisely control the movement amount of the plunger, a complicated control mechanism of the driving device is required. For this reason, there has been a limit to the resolution of the discharge amount in a syringe having a syringe barrel with a large cross-sectional area.

Thus, it has been difficult to achieve both suction and discharge of a large amount of fluid and high-precision discharge of a minute amount of fluid with one pipette device since the suction capacity of the fluid to the syringe and the resolution of the discharge amount are determined by the volume and cross-sectional area of the syringe used.

Also, in order to improve the resolution of the fluid discharge amount, it is conceivable to reduce the cross-sectional area of the syringe barrel to reduce the volume of the syringe. However, in order to manufacture a small-capacity syringe, it is necessary to reduce the inner diameter of the syringe barrel and the diameter of the plunger. It is not easy to complete a long and thin syringe barrel with high accuracy and to reduce the surface roughness of the inner surface of the syringe barrel.

Also, when the plunger diameter is reduced, if the plunger is not driven coaxially with the syringe barrel, there will be a problem in terms of operation and durability of the plunger, such as deformation of the plunger, uneven wearing of a gasket and leakage of fluid due to the deformation of the plunger, and the like.

A first object of the present invention is to provide a pipette device that achieves both suction and discharge of a large volume of fluid and high-precision discharge of a minute amount of fluid, and a second object is to provide a pipette device and an analysis device including a highly-durable small-capacity syringe with a syringe barrel that is easily processed.

Solution to Problem

A pipette device of the present invention includes:
 a first syringe that is capable of suctioning fluid and is capable of discharging fluid with a predetermined discharge precision;
 a second syringe that is capable of suctioning fluid and is capable of discharging fluid with a higher precision than the first syringe;
 a nozzle provided in common to the first syringe and the second syringe;
 a flow path that causes the first syringe and the second syringe to be in communication with each other, and is in communication with the nozzle; and
 a driving unit configured to drive the first syringe and the second syringe such that the first syringe and the second syringe suction and discharge fluid from the nozzle individually or in cooperation with each other.

Also, an analysis device of the present invention includes the pipette device according to the present invention.

Advantageous Effects of Invention

According to the pipette device and the analysis device of the present invention, it is possible to achieve both suction and discharge of a large amount of fluid and high-precision discharge of a minute amount of fluid.

DESCRIPTION OF EMBODIMENTS s

Figure 1:
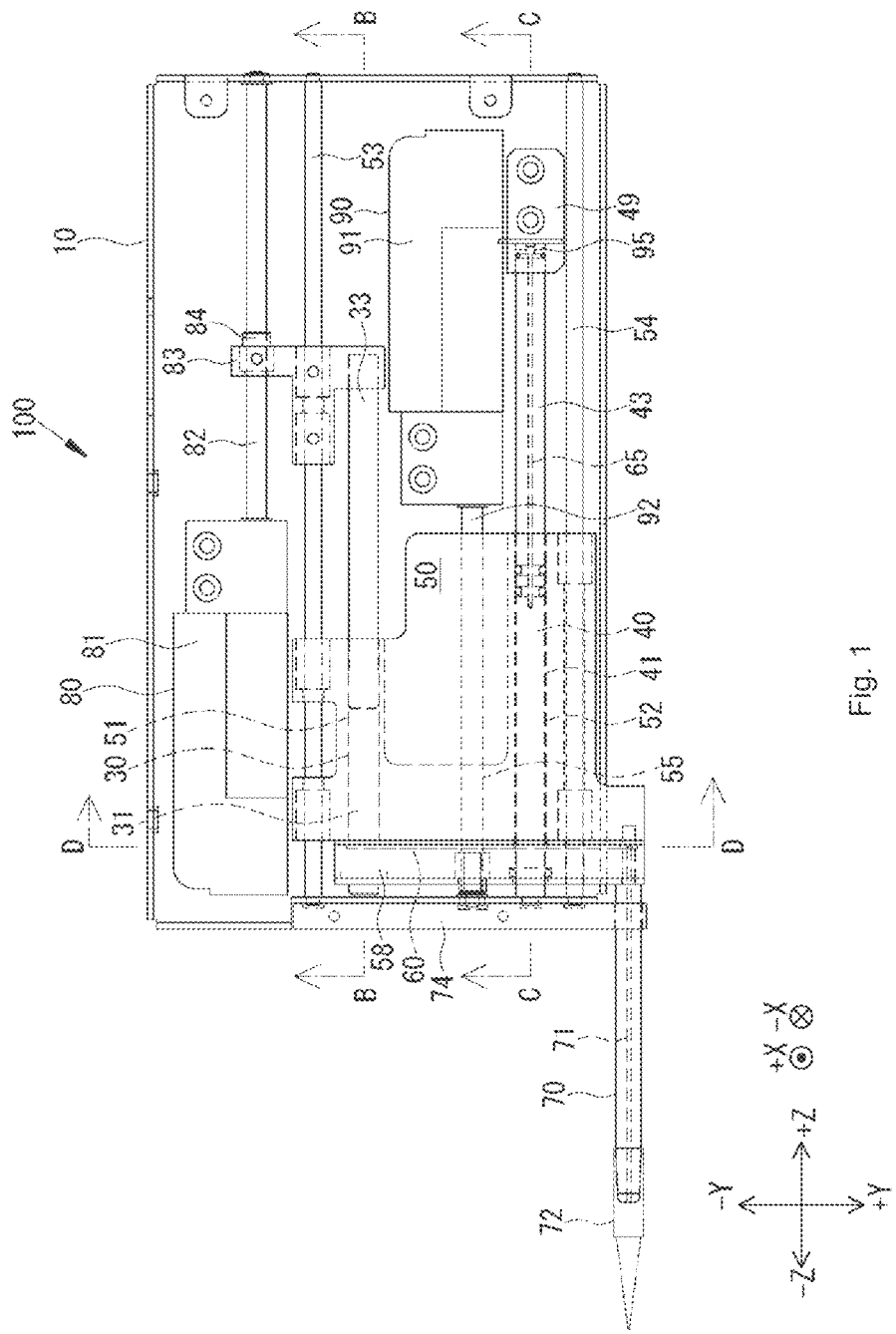
FIG. 1 is a side view showing an overall configuration of a pipette device according to a first embodiment of the present invention.

A pipette device according to an embodiment of the present invention is a pipette device including:
- a first syringe that is capable of suctioning fluid and is capable of discharging fluid with a predetermined discharge precision;
- a second syringe that is capable of suctioning fluid and is capable of discharging fluid with a higher precision than the first syringe;
- a nozzle provided in common to the first syringe and the second syringe;
- a flow path that causes the first syringe and the second syringe to be in communication with each other, and is in communication with the nozzle; and
- a driving unit configured to drive the first syringe and the second syringe such that the first syringe and the second syringe suction and discharge fluid from the nozzle individually or in cooperation with each other (first configuration).

According to the above-described configuration, the first syringe and the second syringe, which is capable of discharging with higher precision than the first syringe, are driven by a driving device individually or in cooperation with each other to suction and discharge fluid through the shared nozzle. Due to the first syringe and the second syringe cooperating with each other, it is possible to suction and discharge a large amount of fluid, and by using the second syringe, it is possible to discharge a minute amount of fluid with high precision. For this reason, it is possible to achieve both suction and discharge of a large amount of fluid and high-precision discharge of a minute amount of fluid.

In the above-described first configuration,
the first syringe may include:
- a first syringe barrel; and
- a first plunger that is arranged inside of the first syringe barrel and is capable of moving forward and backward relative to the first syringe barrel, the second syringe may include:
- a second syringe barrel; and
- a second plunger that is arranged inside of the second syringe barrel and is capable of moving forward and backward relative to the second syringe barrel, the first syringe barrel and the second syringe barrel may be capable of moving forward and backward in a synchronized manner with respect to the first plunger and the second plunger, and the driving unit may include:
- a cylinder driving unit configured to drive the first syringe barrel and the second syringe barrel in a synchronized manner; and
- a plunger driving unit configured to drive one of the first plunger and the second plunger so as to move forward and backward with respect to the first syringe barrel or the second syringe barrel corresponding thereto (second configuration).

According to the above-described configuration, the first syringe barrel and the second syringe barrel are driven by the cylinder driving unit so as to move forward and backward in a synchronized manner with respect to the first plunger and the second plunger, and the plunger driving unit drives one of the first plunger and the second plunger so as to move forward and backward with respect to the first syringe barrel or the second syringe barrel corresponding thereto. For this reason, by operating the first syringe barrel and the second syringe barrel and the corresponding plungers individually or in conjunction with each other, it is possible to perform suction and discharge of fluid from a minute amount to a large amount with a simple configuration, and it is possible to discharge a minute amount of fluid with high precision.

In the above-described second configuration,
- the first syringe barrel and the second syringe barrel may be provided in a shared syringe base,
- the cylinder driving unit may move the first syringe barrel and the second syringe barrel forward and backward with respect to the first plunger and the second plunger by moving the syringe base forward and backward,
- the plunger driving unit may move the first plunger forward and backward with respect to the first cylinder,
- the second plunger may be fixed and not move,
- the first syringe may perform suction and discharge of fluid due to the first plunger and the first syringe barrel provided in the syringe base moving forward and backward relative to each other, and
- the second syringe may perform suction and discharge of fluid due to the second syringe barrel provided in the syringe base moving forward and backward with respect to the second plunger (third configuration).

According to the above-described configuration, the first syringe barrel and the second syringe barrel are provided in a shared syringe base. By providing a plurality of syringes in one syringe base, the number of parts and assembly man-hours can be reduced.

In the above-described third configuration,
the second syringe may further include:
- a pressure measurement flow path that is provided in the second plunger and is in communication with the inside of the second syringe barrel; and
- a pressure detection unit configured to detect a pressure of fluid in the pressure measurement flow path (fourth configuration).

According to the above-described configuration, the pressure detection unit measures the pressure of fluid in the pressure measurement flow path provided in the second plunger, which is fixed and does not move. Since the second plunger is fixed and does not move forward and backward, it is possible to reduce the load on a wiring portion such as a harness connected to the pressure measurement unit, and it is possible to improve the electrical reliability and durability.

In the above-described fourth configuration,
the pressure measurement flow path may be formed inside of the second plunger, toward an end in a direction of retreating from the second syringe barrel, and the pressure detection unit may be coaxial with the second plunger and be provided on the end side of the second plunger (fifth configuration).

According to the above-described configuration, the pressure detection unit is coaxial with the second plunger and is provided on the end side of the second plunger. For this reason, the need for a separate chamber for providing the pressure detection unit is eliminated, dead volume can be reduced, and the pipette device can be made compact. Also, since the pressure in the second syringe is directly detected, the detection accuracy can be improved.

In the above-described first to fifth configurations,
the second syringe may include
an insertion portion that is arranged inside of the second syringe barrel and forms a gap with an inner surface of the second syringe barrel, the gap serving as a storage space for storing fluid, and
the second plunger may suction fluid in the gap and discharge fluid stored in the gap by moving forward and backward relative to the second syringe barrel (sixth configuration).

According to the above-described configuration, a gap is formed between the second syringe barrel and the insertion portion, and this gap serves as a storage space for storing the fluid. By reducing the cross-sectional area of the gap between the second syringe barrel and the insertion portion, the volume of the second syringe is reduced and the resolution of the fluid discharge amount can be improved. For this reason, in order to manufacture a syringe having a small capacity, it is not necessary to drill a long hole with a small diameter to form a syringe barrel having a small diameter, and a syringe having a small capacity and high discharge precision can be easily formed.

In the above-described sixth configuration,
the insertion portion may be formed in one piece with the second plunger and move forward and backward relative to the second syringe barrel, together with the second plunger (seventh configuration).

According to the above-described configuration, the insertion portion is formed in one piece with the second plunger. For this reason, the number of parts can be reduced and assembly man-hours can be reduced.

An analysis device according to an embodiment of the present invention includes
the pipette device having any of the above-mentioned first to seventh configurations.

According to the above-described configuration, a pipette device is included in which the first syringe and the second syringe, which is capable of discharging with a higher precision than the first syringe, are driven by the driving device individually or in cooperation with each other to suction or discharge fluid through the shared nozzle. Due to the first syringe and the second syringe of the pipette device cooperating with each other, it is possible to suction and discharge a large amount of fluid, and the second syringe can discharge a minute amount of fluid with high accuracy. For this reason, it is possible to achieve both suction and discharge of a large amount of fluid and high-precision discharge of a minute amount of fluid.

First Embodiment

Hereinafter, a pipette device 100 according to an embodiment of the present invention will be described in detail with reference to the drawings. Identical or corresponding parts in the drawings are denoted by identical reference numerals, and description thereof will not be repeated. It should be noted that, in order to make the description easy to understand, in the drawings referred to below, configurations are shown in a simplified or schematic manner, or some constituent members are omitted. Also, the dimensional ratios between the constituent members shown in each figure do not necessarily indicate the actual dimensional ratios.

In the drawings below, the vertically upward direction of the pipette device 100 in the use state is the +Z direction, and the vertically downward direction of the pipette device 100 in the use state is the −Z direction. Also, one direction orthogonal to the +Z direction is the +X direction, and one direction orthogonal to the +Z direction and the +X direction is the +Y direction. The opposite directions to the +X direction and the +Y direction are the −X direction and the −Y direction, respectively.

Overall Configuration

First, the overall configuration of the pipette device 100 will be described. FIG. 1 is a side view showing the overall configuration of the pipette device 100 according to an embodiment of the present invention. As shown in FIG. 1, the pipette device 100 includes a casing 10, a first syringe 30, a second syringe 40, a syringe base 50, a flow path 60, a nozzle 70, a first driving unit 80, and a second driving unit 90.

The casing 10 is a portion forming the base of the pipette device 100. The casing 10 is made of sheet metal.

The first syringe 30 can suction fluid and discharge fluid with a predetermined discharge precision. The first syringe 30 has a first syringe barrel 31 and a first plunger 33. The first syringe 30 is arranged parallel to the Z direction.

The first syringe barrel 31 is constituted by a cylindrical first cavity 51 formed in the syringe base 50 and a nozzle fixing portion 58 fixed to the syringe base 50. The syringe base 50 and the nozzle fixing portion 58 forming the first syringe barrel 31 are moved forward and backward in the Z direction by the second driving unit 90. For this reason, the first syringe barrel 31 can move forward and backward in the Z direction.

The first plunger 33 is inserted in the first syringe barrel 31. The first plunger 33 is moved forward and backward in the Z direction by the first driving unit 80.

In this embodiment, the syringe base 50 and the first plunger 33 can each move forward and backward in the Z direction. For this reason, the first syringe 30 can suction fluid into the first syringe barrel 31 or discharge the fluid suctioned into the first syringe barrel 31 due to the first plunger 33 and the first syringe barrel 31 provided in the syringe base 50 moving forward and backward relative to each other.

The second syringe 40 can suction the fluid and can discharge the fluid with higher precision than the first syringe 30. The second syringe 40 has a second syringe barrel 41 and a second plunger 43. The second syringe 40 is arranged parallel to the Z direction.

The second syringe barrel 41 is constituted by a cylindrical second cavity 52 formed in the syringe base 50 and a nozzle fixing portion 58 fixed to the syringe base 50. The syringe base 50 and the nozzle fixing portion 58 forming the second syringe barrel 41 are moved forward and backward in the Z direction by the second driving unit 90. For this reason, the second syringe barrel 41 can move forward and backward in the Z direction.

The second plunger 43 is inserted in the second syringe barrel 41. In the present embodiment, the second plunger 43 is fixed to the casing 10 via a fixing portion 49, and the syringe base 50 can move forward and backward in the Z direction. For this reason, in the second syringe 40, due to the second syringe barrel 41 provided in the syringe base 50 moving forward and backward with respect to the second plunger 43, the second plunger 43 moves forward and backward relative to the second syringe barrel 41. As a result, fluid can be suctioned into the second syringe barrel 41 or the fluid suctioned into the second syringe barrel 41 can be discharged.

The syringe base 50 configures the first syringe barrel 31 and the second syringe barrel 41 together with the nozzle fixing portion 58. The syringe base 50 and the nozzle fixing portion 58 are supported by a first guide shaft 53 and a second guide shaft 54 so as to be able to move forward and backward in the Z direction. The first guide shaft 53 and the second guide shaft 54 are arranged parallel to each other in the Z direction.

The syringe base 50 and the nozzle fixing portion 58 are moved forward and backward in the Z direction by the second driving unit 90. Due to the first syringe barrel 31 and the second syringe barrel 41 being provided on the shared syringe base 50, the first syringe barrel 31 and the second syringe barrel 41 can move forward and backward in a synchronized manner with respect to the first plunger 33 and the second plunger 43.

The flow path 60 causes the first syringe 30 (first syringe barrel 31) and the second syringe 40 (second syringe barrel 41) to be in communication with each other, and is in communication with the nozzle 70. The flow path 60 is formed between the syringe base 50 and the nozzle fixing portion 58.

The nozzle 70 is provided in common to the first syringe 30 and the second syringe 40. The nozzle 70 is attached to the nozzle fixing portion 58. A nozzle flow path 71 is formed inside the nozzle 70. The nozzle flow path 71 is in communication with the flow path 60, and is in communication with the first syringe 30 and the second syringe 40 via the flow path 60. The nozzle 70 can move forward and backward in the Z direction together with the syringe base 50 and the nozzle fixing portion 58.

A replaceable disposable tip 72 is attached to the leading end of the nozzle 70. Fluid such as a test solution is suctioned into the disposable tip 72 due to the fluid being suctioned by the first syringe 30 and/or the second syringe 40. Also, due to the fluid being discharged by the first syringe 30 and/or the second syringe 40, the fluid such as the test solution suctioned into the disposable tip 72 is discharged.

The nozzle 70 passes through a tip detaching portion 74 fixed to the casing 10. The tip detaching portion 74 is a member for coming into contact with the disposable tip 72 and detaching the disposable tip 72 from the leading end of the nozzle 70 when the disposable tip 72 attached to the leading end of the nozzle 70 is to be detached. Specifically, when the nozzle 70 to which the disposable tip 72 is attached moves in the +Z direction (see, for example, FIG. 9), the tip detaching portion 74 is brought into contact with the disposable tip 72, and the disposable tip 72 is detached from the leading end of the nozzle 70.

The first driving unit 80 causes the first syringe 30 to suction or discharge the fluid by moving the first plunger 33 forward and backward with respect to the first syringe barrel 31. The first driving unit 80 has a first motor 81, a screw shaft 82, and a moving portion 83. The first driving unit 80 constitutes a mechanism that converts the rotational driving force of the first motor 81 into a driving force in a linear direction in the Z direction, and moves the first plunger 33 forward and backward in the Z direction. The first driving unit 80 corresponds to the plunger driving unit of the present invention.

The first motor 81 is fixed to the casing 10 and rotates the screw shaft 82 in the forward and reverse directions according to the drive control of the control unit (not shown).

One end of the screw shaft 82 is connected to the drive shaft of the first motor 81. The screw shaft 82 is arranged parallel to the Z direction and is arranged so as to be parallel to the first syringe 30 and the first guide shaft 53.

The moving portion 83 has a nut portion 84 that is screwed onto the screw shaft 82, and is supported by the first guide shaft 53 so as to be able to move forward and backward in the Z direction. Also, the first plunger 33 is connected to the moving portion 83.

When the first motor 81 rotates the screw shaft 82 in the forward and reverse directions by a certain angle according to the drive control of the control unit (not shown), the moving portion 83 screwed onto the screw shaft 82 moves forward and backward in the Z direction according to the rotation direction and rotation angle of the screw shaft 82. As a result, the first plunger 33 can be moved forward and backward in the Z direction.

The second driving unit 90 moves the syringe base 50 forward and backward, thereby causing the first syringe barrel 31 and the second syringe barrel 41 to move forward and backward with respect to the first plunger 33 and the second plunger 43 in a synchronized state and causing the first syringe 30 and the second syringe 40 to perform suction or discharge of fluid. The second driving unit 90 has a second motor 91 and a screw shaft 92. The second driving unit 90 corresponds to the cylinder driving unit of the present invention.

The second motor 91 is fixed to the casing 10 and rotates the screw shaft 92 in the forward and reverse directions according to the drive control of the control unit (not shown).

One end of the screw shaft 92 is connected to the drive shaft of the second motor 91. The screw shaft 92 is arranged parallel to the Z direction and is screwed into a nut hole portion 55 formed in the syringe base 50.

When the second motor 91 rotates the screw shaft 92 in the forward and reverse directions by a certain angle according to the drive control of the control unit (not shown), the syringe base 50 moves forward and backward in the Z direction according to the rotation direction and the rotation angle of the screw shaft 92. As a result, the first syringe barrel 31 and the second syringe barrel 41 can be moved forward and backward in the Z direction in a synchronized state.

The first driving unit 80 and the second driving unit 90 are driven and controlled by a control unit (not shown) provided inside or outside of the pipette device 100. The control unit drives and controls the first driving unit 80 and the second driving unit 90 so that the first syringe 30 and the second syringe 40 suction and discharge the fluid individually or in cooperation with each other.

Figure 2:
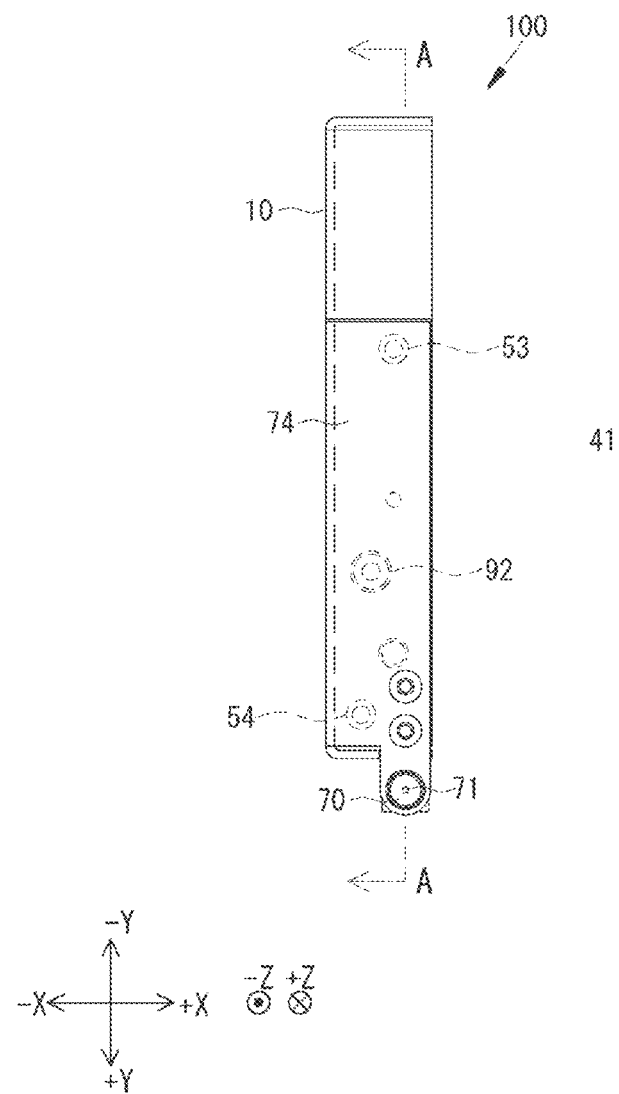
FIG. 2 is a view of the pipette device of FIG. 1 from the +Z direction.

FIG. 2 is a view of the pipette device 100 of FIG. 1 from the +Z direction. As shown in FIG. 2, the tip detaching portion 74 is fixed to the casing 10. The nozzle 70 is provided so as to pass through the tip detaching portion 74.

Figure 3:
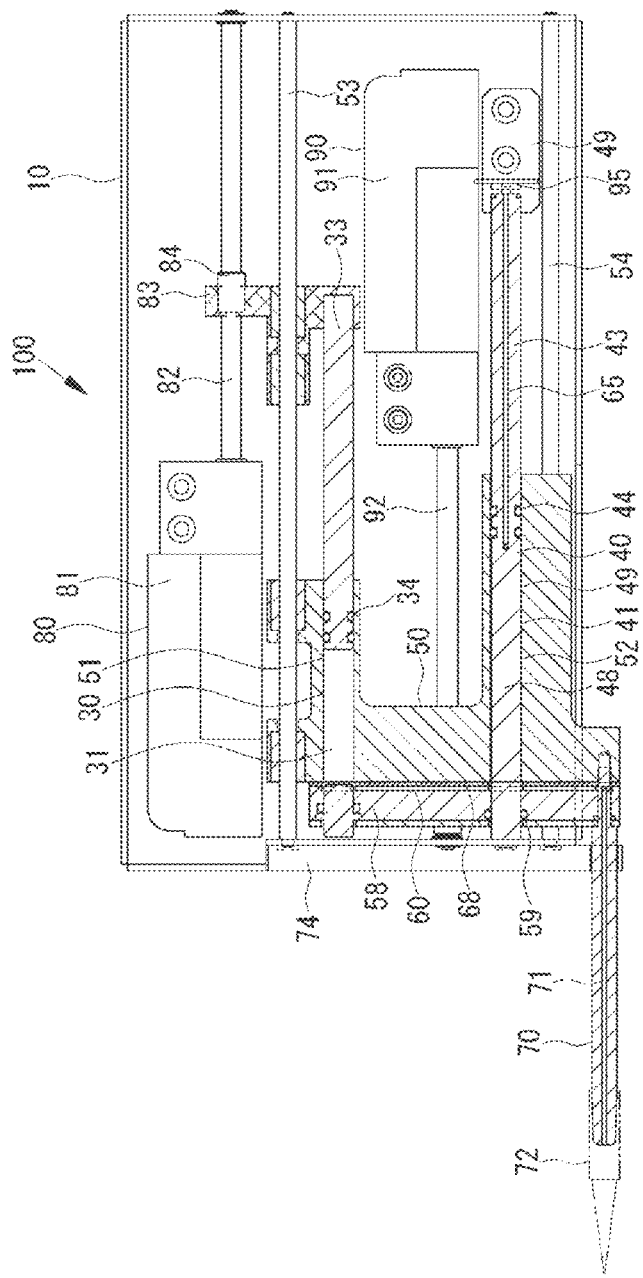
FIG. 3 is a cross-sectional view taken along line A-A of FIG. 2.

FIG. 3 is a cross-sectional view taken along line A-A of FIG. 2. As shown in FIG. 3, the first syringe barrel 31 and the second syringe barrel 41 are constituted by the cylindrical first cavity 51, the second cavity 52, and the nozzle fixing portion 58 formed in the syringe base 50.

The flow path 60 is formed between the syringe base 50 and the nozzle fixing portion 58. The flow path 60 is constituted by a groove formed in the syringe base 50 and the nozzle fixing portion 58 (see FIG. 6). The flow path 60 causes the first syringe barrel 31, the second syringe barrel 41, and the nozzle flow path 72 to be in communication with each other. Packing 68 is arranged around the flow path 60 so that the fluid does not leak from the flow path 60.

The first plunger 33 is inserted in the first syringe barrel 31. A gasket 34 is attached near the end of the first plunger 33. The gasket 34 is in contact with the inner surface of the first syringe barrel 31 to prevent fluid from leaking from the gap between the first syringe barrel 31 and the first plunger 33.

The first syringe barrel 31 and the first plunger 33 move forward and backward in the Z direction due to the first driving unit 80 and the second driving unit 90, respectively. Due to the relative movement of the first syringe barrel 31 and the first plunger 33, the first plunger 33 moves forward and backward relative to the first syringe barrel 31, and fluid can be suctioned into the first syringe barrel 31 or the fluid suctioned into the first syringe barrel 31 can be discharged via the flow path 60.

The second plunger 43 and an insertion portion 48 are inserted in the second syringe barrel 41. In the present embodiment, the second plunger 43 and the insertion portion 48 are members formed in one piece with each other.

A gasket 44 is attached to the second plunger 43. The gasket 44 is in contact with the inner surface of the second syringe barrel 41 to prevent fluid from leaking from the gap between the second syringe barrel 41 and the second plunger 43.

The insertion portion 48 extends to the nozzle fixing portion 58. A gasket 59 is arranged between the nozzle fixing portion 58 and the insertion portion 48. There is a gap between the insertion portion 48 and the inner surface of the second syringe barrel 41. This gap forms a storage space 49 for storing fluid (see FIG. 5). Specifically, the gap that is formed between the inner surface of the second syringe barrel 41 and the insertion portion 48 and is interposed between the gasket 44 and the gasket 59 is the storage space 49. The storage space 49 is in communication with the flow path 60.

Due to the second syringe barrel 41 being moved forward and backward in the Z direction by the second driving unit 90, the second plunger 43 fixed to the casing 10 and the insertion portion 48 are moved forward and backward relative to the second syringe barrel 41, and the volume of the storage space 49 interposed between the gasket 44 and the gasket 59 increases or decreases. As a result, the fluid can be suctioned into the second syringe barrel 41 (storage space 49) through the flow path 60, or the fluid suctioned into the second syringe barrel 41 (storage space 49) can be discharged through the flow path 60.

Due to the insertion portion 48 being inserted into the second syringe barrel 41, the volume of the second syringe barrel 41 becomes smaller. Since the substantial cross-sectional area of the second syringe barrel 41 is the cross-sectional area of the storage space 49, it can be made smaller than the cross-sectional area of the first syringe barrel 31. For this reason, the resolution of the fluid discharge amount of the second syringe 40 can be made higher than the resolution of the fluid discharge amount of the first syringe 30.

The second syringe 40 is provided with a pressure measurement flow path 65 and a pressure detection unit 95. The pressure measurement flow path 65 is formed inside of the second plunger 43. The end of the pressure measurement flow path 65 in the +Z direction is open at the end face of the second plunger 43. Also, the end of the pressure measurement flow path 65 in the −Z direction is in communication with the second syringe barrel 41 (storage space 49).

The pressure detection unit 95 measures the pressure of the fluid in the pressure measurement flow path 65. The pressure detection unit 95 is coaxial with the second plunger 43 and is provided on the end side of the second plunger 43 in the +Z direction. The pressure detection unit 95 can detect, for example, that the leading end of the nozzle 70 has approached the liquid surface of the test solution by measuring the change in the fluid pressure in the pressure measurement flow path 65.

Figure 4:
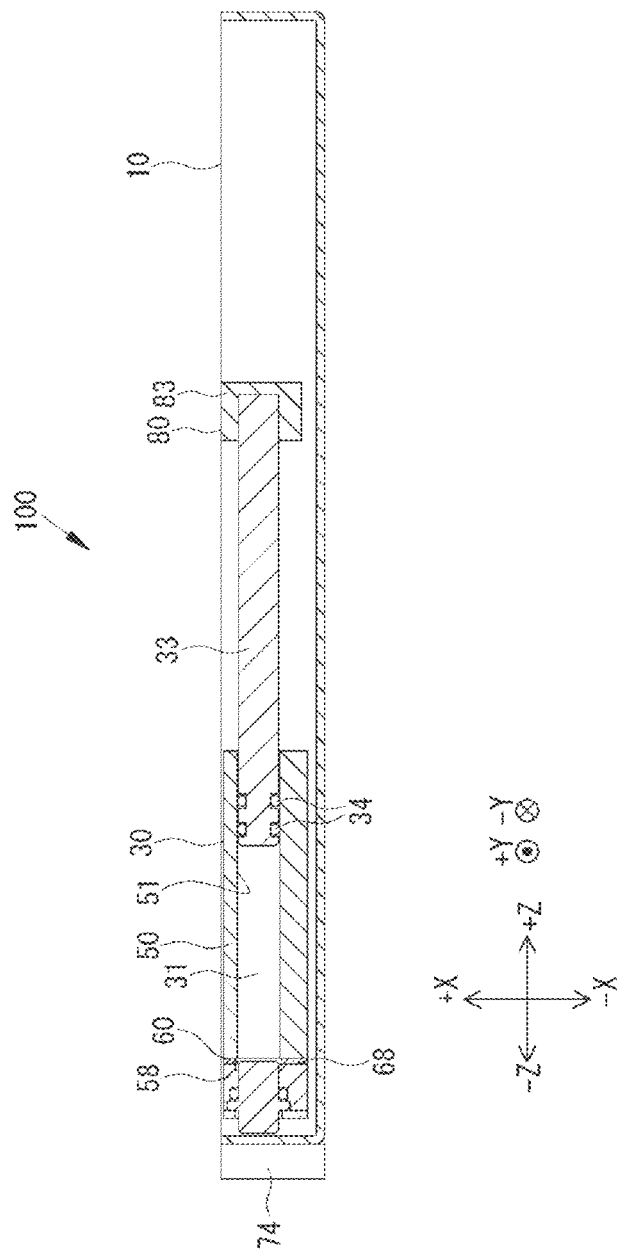
FIG. 4 is a cross-sectional view taken along line B-B of FIG. 1.

FIG. 4 is a cross-sectional view taken along line B-B of FIG. 1. FIG. 4 shows a cross-section of the first syringe 30. As shown in FIG. 4, the first syringe barrel 31 is constituted by the cylindrical first cavity 51 formed in the syringe base 50 and the nozzle fixing portion 58.

The flow path 60 is formed between the syringe base 50 and the nozzle fixing portion 58. The flow path 60 causes the first syringe barrel 31 to be in communication with the second syringe barrel 41 and the nozzle flow path 72.

The first plunger 33 is inserted in the first syringe barrel 31. The gasket 34 is attached near the end of the first plunger 33.

Since the syringe base 50 moves forward and backward in the Z direction due to the second driving unit 90, the first syringe barrel 31 also moves forward and backward in the Z direction together with the syringe base 50. Also, the first plunger 33 moves forward and backward in the Z direction due to the first driving unit 80. Due to the relative movement of the first syringe barrel 31 and the first plunger 33, the first plunger 33 moves forward and backward relative to the first syringe barrel 31, and fluid can be suctioned into the first syringe barrel 31 or the fluid suctioned into the first syringe barrel 31 can be discharged via the flow path 60.

Figure 5:
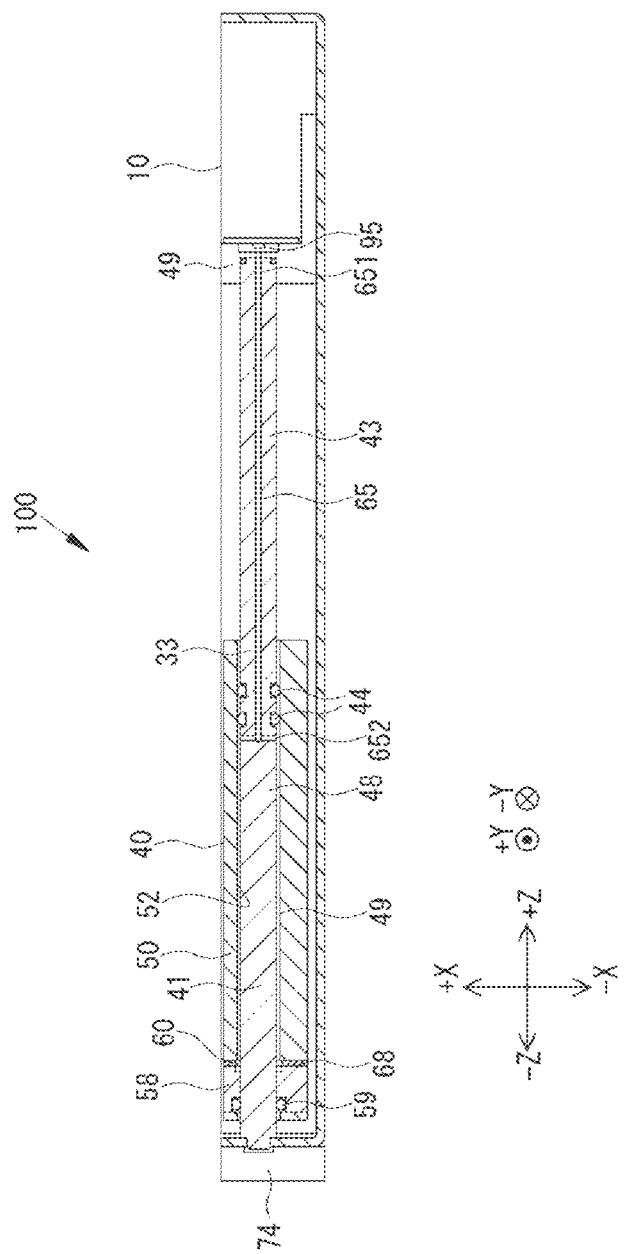
FIG. 5 is a cross-sectional view taken along line C-C of FIG. 1.

FIG. 5 is a cross-sectional view taken along line C-C of FIG. 1. FIG. 5 shows a cross-section of the second syringe 40. As shown in FIG. 5, the second syringe barrel 41 is constituted by a cylindrical second cavity 52 formed in the syringe base 50 and a nozzle fixing portion 58.

The flow path 60 is formed between the syringe base 50 and the nozzle fixing portion 58. The flow path 60 causes the second syringe barrel 41 to be in communication with the first syringe barrel 31 and the nozzle flow path 72.

The second plunger 43 and the insertion portion 48 are inserted in the second syringe barrel 41.

The gasket 44 provided on the second plunger 43 is in contact with the inner surface of the second syringe barrel 41 to prevent fluid from leaking from the gap between the second syringe barrel 41 and the second plunger 43.

The insertion portion 48 extends to the nozzle fixing portion 58. The gasket 59 provided between the nozzle fixing portion 58 and the insertion portion 48 prevents fluid from leaking from the gap between the nozzle fixing portion 58 and the insertion portion 48.

There is a gap forming a storage space 49 between the insertion portion 48 and the inner surface of the second syringe barrel 41. Specifically, the gap that is formed between the inner surface of the second syringe barrel 41 and the insertion portion 48 and is interposed between the gasket 44 and the gasket 59 is the storage space 49. The storage space 49 is in communication with the flow path 60.

Since the syringe base 50 moves forward and backward in the Z direction due to the second driving unit 90, the second syringe barrel 41 also moves forward and backward in the Z direction together with the syringe base 50. Due to the second syringe barrel 41 moving forward and backward in the Z direction, the second plunger 43 fixed to the casing 10 and the insertion portion 48 move forward and backward relative to the second syringe barrel 41, and the volume of the storage space 49 interposed between the gasket 44 and the gasket 59 increases and decreases. As a result, fluid can be suctioned into the second syringe barrel 41 (storage space 49) through the flow path 60, or the fluid suctioned into the second syringe barrel 41 (storage space 49) can be discharged through the flow path 60.

The second syringe 40 is provided with a pressure measurement flow path 65 and a pressure detection unit 95. An end 651 of the pressure measurement flow path 65 in the +Z direction is open at the end face of the second plunger 43. Also, an end 652 of the pressure measurement flow path 65 in the −Z direction is in communication with the second syringe barrel 41 (storage space 49). The change in fluid pressure in the pressure measurement flow path 65 is measured by the pressure detection unit 95.

Figure 6:
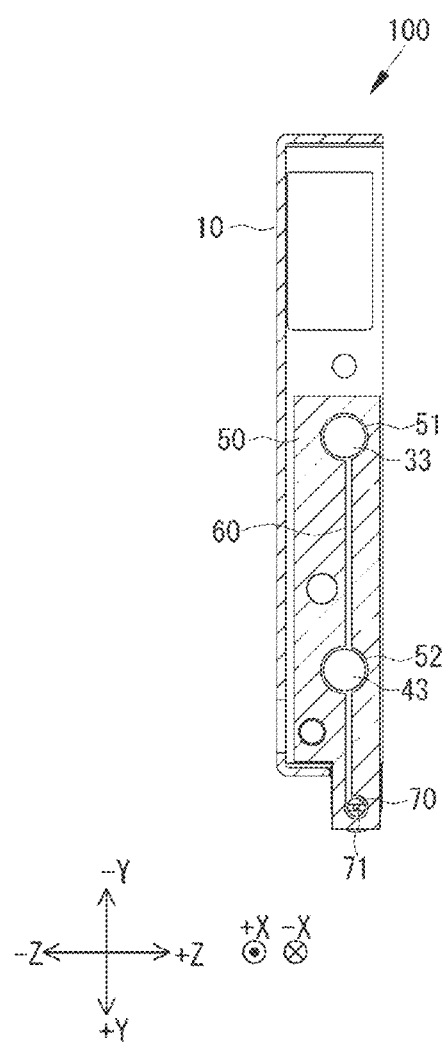
FIG. 6 is a cross-sectional view taken along line D-D of FIG. 1.

FIG. 6 is a cross-sectional view taken along line D-D of FIG. 1. FIG. 6 shows a cross-section of the flow path 60. As shown in FIG. 6, the flow path 60 is constituted by a groove formed in the syringe base 50 and the nozzle fixing portion 58. The flow path 60 causes the first syringe barrel 31, the second syringe barrel 41 (storage space 49), and the nozzle flow path 72 to be in communication with each other.

Figure 7:
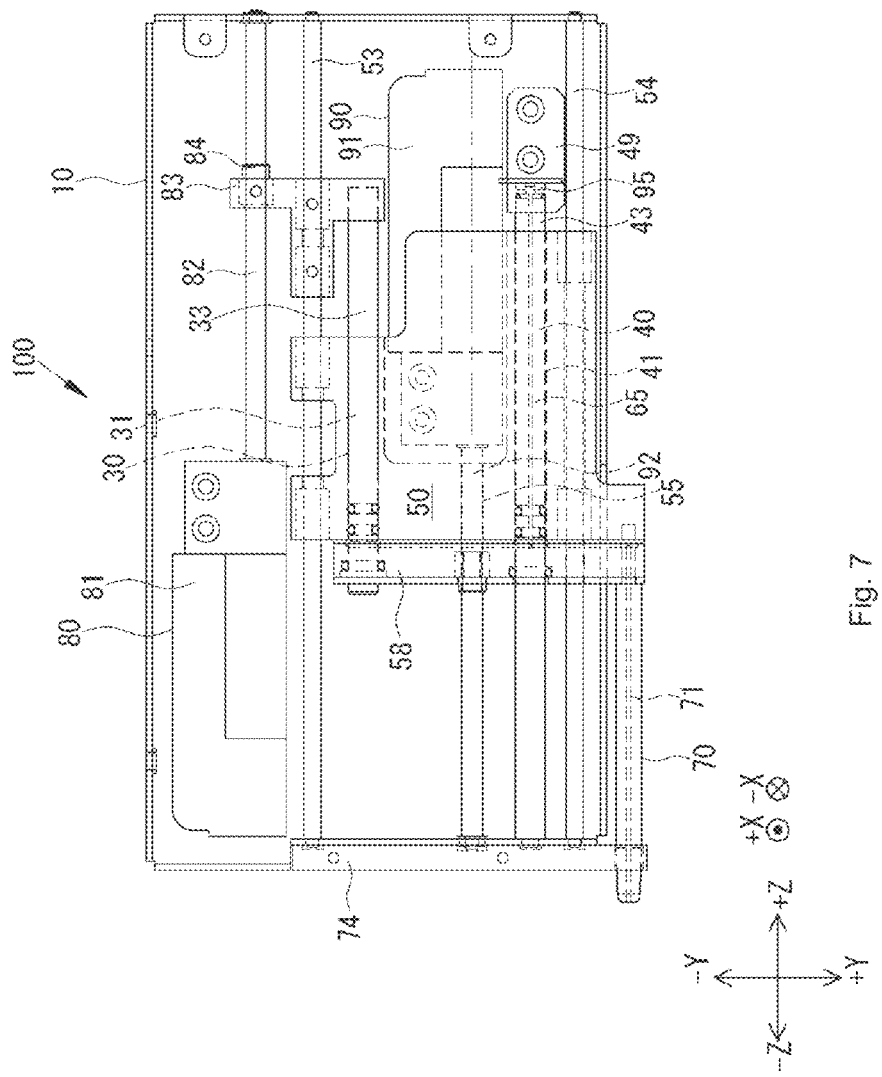
FIG. 7 is a diagram showing an operating state of the pipette device.
Figure 8:
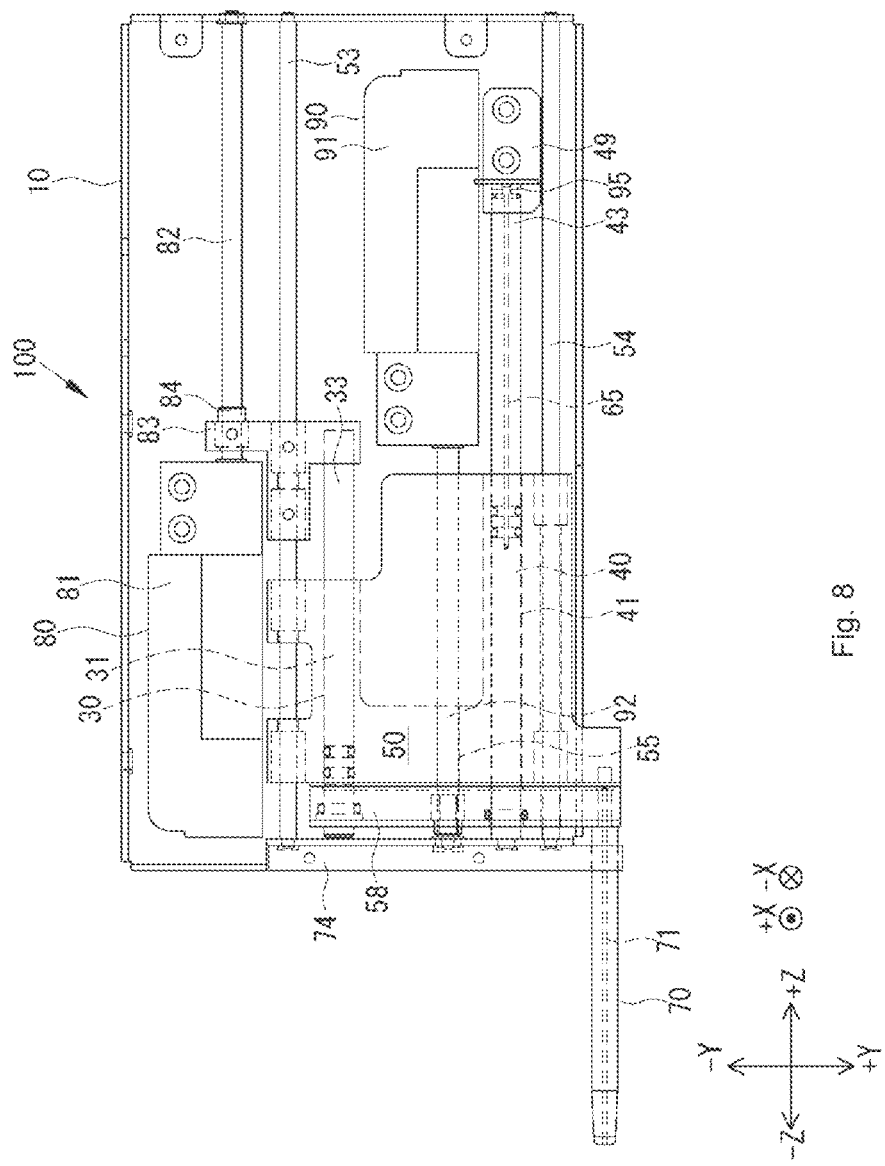
FIG. 8 is a diagram showing an operating state of the pipette device.
Figure 9:
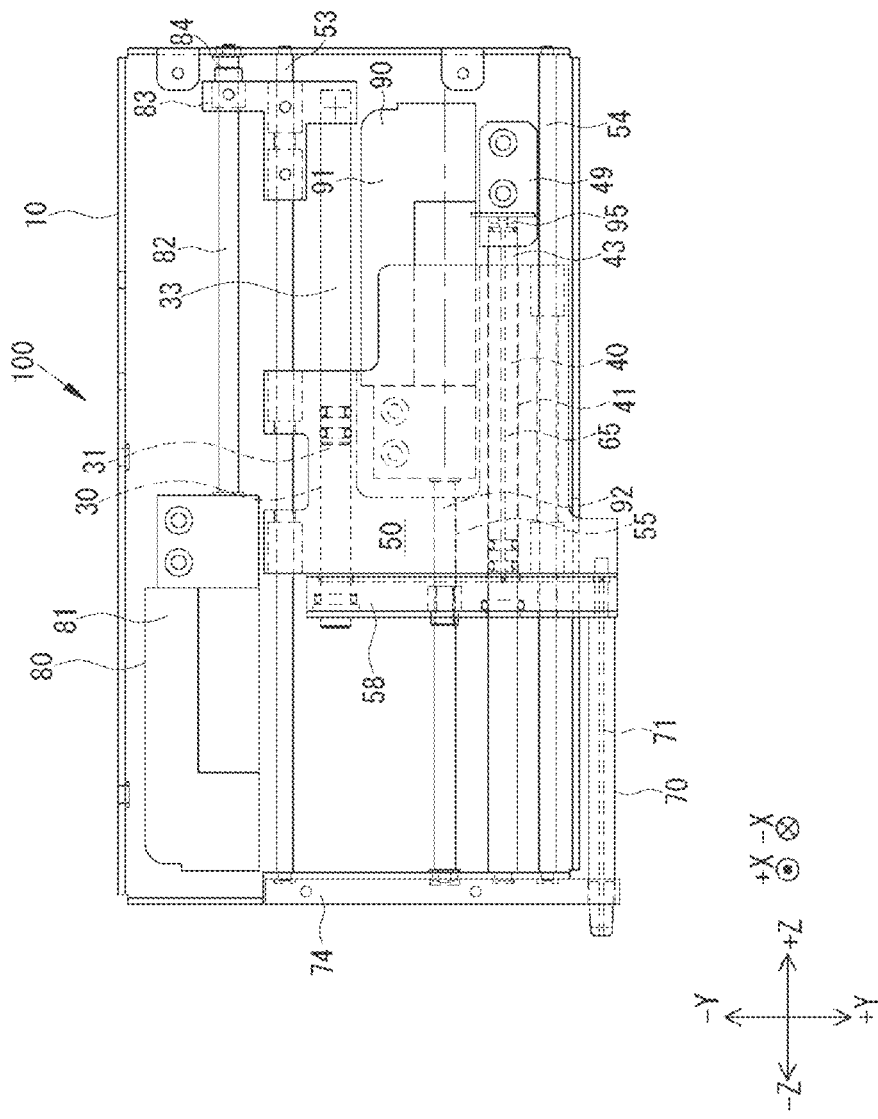
FIG. 9 is a diagram showing an operating state of the pipette device.

FIGS. 7 to 9 are diagrams showing an operating state of the pipette device 100.

FIG. 7 shows a state in which the inner capacity of the first syringe 30 is at a minimum and the inner capacity of the second syringe 40 is also at a minimum. FIG. 8 shows a state in which the inner capacity of the first syringe 30 is at a minimum and the inner capacity of the second syringe 40 is at a maximum. FIG. 9 shows a state in which the inner capacity of the first syringe 30 is at a maximum and the inner capacity of the second syringe 40 is at a minimum. Note that FIGS. 1 and 3 show a state in which the inner capacity of the first syringe 30 is at a maximum and the inner capacity of the second syringe 40 is also at a maximum.

The first syringe 30 and the second syringe 40 can perform suction or discharge of a fluid from a minute amount to a large amount by suctioning or discharging fluid individually and/or in cooperation with each other. In particular, by operating the second syringe 40 to discharge the fluid, it is possible to discharge a minute amount of fluid with high precision.

In the state shown in FIG. 7, the syringe base 50 and the moving portion 83 are the closest to each other, whereby the first plunger 33 is inserted by the maximum depth into the first syringe barrel 31. For this reason, the inner capacity of the first syringe 30 is at a minimum.

Also, due to the syringe base 50 having moved the maximum distance in the +Z direction, the second plunger 43 is inserted by the maximum depth into the second syringe barrel 41. For this reason, the inner capacity of the second syringe 40 is also at a minimum.

In the state shown in FIG. 8, due to the syringe base 50 and the moving portion 83 being the closest to each other, the first plunger 33 is inserted by the maximum depth into the first syringe barrel 31. For this reason, the inner capacity of the first syringe 30 is at a minimum.

On the other hand, due to the syringe base 50 having been moved the maximum distance in the −Z direction, the second plunger 43 is inserted at the shallowest position with respect to the second syringe barrel 41. For this reason, the inner capacity of the second syringe 40 is at a maximum.

In the state shown in FIG. 9, due to the syringe base 50 and the moving portion 83 being spaced apart from each other by the maximum distance, the first plunger 33 is inserted at the shallowest position with respect to the first syringe barrel 31. For this reason, the inner capacity of the first syringe 30 is at a maximum.

On the other hand, due to the syringe base 50 having moved the maximum distance in the +Z direction, the second plunger 43 is inserted by the maximum depth into the second syringe barrel 41. For this reason, the inner capacity of the second syringe 40 is at a minimum.

In the state shown in FIGS. 1 and 3, due to the syringe base 50 and the moving portion 83 being spaced apart from each other by the maximum distance, the first plunger 33 is inserted at the shallowest position with respect to the first syringe barrel 31. For this reason, the inner capacity of the first syringe 30 is at a maximum.

Also, due to the syringe base 50 having moved the maximum distance in the −Z direction, the second plunger 43 is inserted at the shallowest position with respect to the second syringe barrel 41. For this reason, the inner capacity of the second syringe 40 is also at a maximum.

According to the pipette device 100 described above, the first syringe 30 and the second syringe 40, which is capable of discharging with higher precision than the first syringe 30, are driven individually or in cooperation with each other by the first driving unit 80 and the second driving unit 90 to suction or discharge fluid through the shared nozzle 70. Due to the first syringe 30 and the second syringe 40 cooperating with each other, it is possible to suction and discharge a large amount of fluid, and by using the second syringe 40, it is possible to discharge a minute amount of fluid with high precision. For this reason, it is possible to achieve both suction and discharge of a large amount of fluid and high-precision discharge of a minute amount of fluid.

Also, a gap is formed between the second syringe barrel 41 and the insertion portion 48, and this gap serves as a storage space 49 for storing the fluid. By reducing the cross-sectional area of the gap between the second syringe barrel 41 and the insertion portion 48, the volume of the second syringe 40 is reduced and the resolution of the fluid discharge amount can be improved. For this reason, in order to manufacture a syringe having a small capacity, it is not necessary to drill a long hole with a small diameter to form a syringe barrel having a small diameter, and a syringe having a small capacity and high discharge precision can be easily formed.

Second Embodiment

Figure 10:
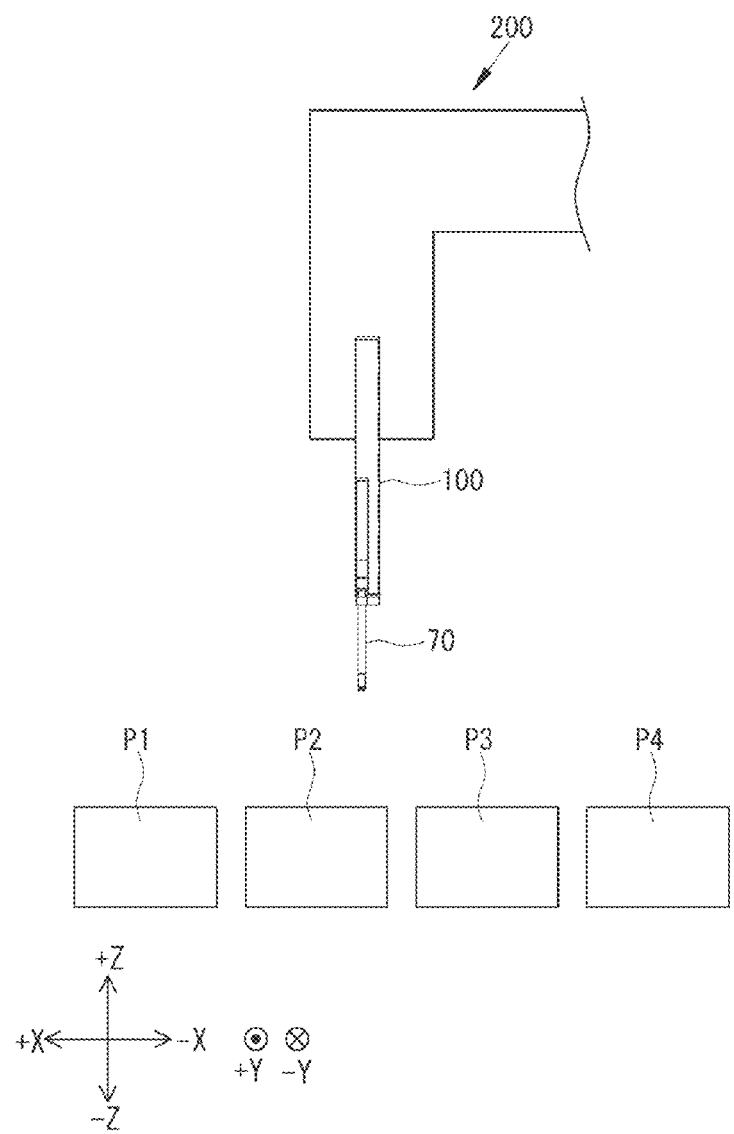
FIG. 10 is a diagram showing an operating state of an analysis device according to a second embodiment of the present invention.

Next, an example of an analysis device 200 according to a second embodiment and the operation of the analysis device 200 will be described. FIG. 10 is a diagram showing an operating state of the analysis device 200 according to the second embodiment of the present invention. The analysis device 200 includes a plurality of pipette devices 100. In the following description, one of the plurality of pipette devices 100 provided in the analysis device 200 will be described. Also, in the following, points that are the same as in the pipette device 100 of the first embodiment will be omitted, and the differences will be mainly described.

The analysis device 200 includes the pipette device 100, a moving mechanism 210, and a control unit (not shown). The moving mechanism 210 is capable of moving the pipette device 100 in the X, Y, and Z directions. The control unit controls the operation of the pipette device 100 and the moving mechanism 210 so as to suction and dispense an analysis target sample (test solution) according to a procedure of an analysis task.

Unit Initialize

The origin position is the state in which the first driving unit 80 and the second driving unit 90 of the pipette device 100 are driven so that the inner capacity of the first syringe 30 is at a minimum and the inner capacity of the second syringe 40 is at a maximum (see FIG. 8). Also, the initial position is a position where the syringe base 50 and the first plunger 33 are raised from the origin position by a predetermined height in the +Z direction (e.g., raised about 0.5 mm). After setting the initial position, the first driving unit 80 and the second driving unit 90 of the pipette device 100 are driven, and standby is performed in a state where the inner capacity of the first syringe 30 is at a maximum and the inner capacity of the second syringe 40 is at a minimum (FIG. 9).

Attachment of Disposable Tip

When a dispensing operation is started, the disposable tip 72 is first attached to the nozzle 70. The moving mechanism 210 is operated in the XY direction (horizontal direction) to move the pipette device 100 above a tip attachment position P1, and then the moving mechanism 210 is operated in the −Z direction (vertically downward direction) to lower the pipette device 100 to a predetermined height.

The first driving unit 80 and the second driving unit 90 of the pipette device 100 are driven in a synchronized manner, and the syringe base 50 is lowered to move the nozzle 70 in the −Z direction while keeping the inner capacity of the first syringe 30 at a minimum. The leading end of the nozzle 70 is pressed against the disposable tip 72 due to the movement of the leading end of the nozzle 70 protruding from the casing 10, and the disposable tip 72 is attached. After attaching the disposable tip 72, the moving mechanism 210 is operated in the +Z direction (vertically upward direction) to raise the pipette device 100 to a predetermined height and withdraw the pipette device 100 from the tip attachment position P1.

Liquid Surface Detection

Suction of the analysis target sample (test solution) is started. First, the liquid surface of the analysis target sample (test solution) is detected. The moving mechanism 210 is operated in the XY direction (horizontal direction) to move the pipette device 100 above an analysis target sample container P2, and then the moving mechanism 210 is operated in the −Z direction (vertically downward direction) to lower the pipette device 100 to a predetermined height.

After lowering the pipette device 100 to a predetermined height, the first driving unit 80 and the second driving unit 90 of the pipette device 100 are driven in a synchronized manner to further lower the pipette device 100 while pulling the nozzle 70 into the casing 10.

In this case, since the volume of the second syringe 40 is reduced while keeping the inner capacity of the first syringe 30 at a minimum, the pressure in the second syringe 40 is monitored by the pressure detection unit 95 while air is discharged from the leading end of the nozzle 70. When the leading end of the nozzle 70 approaches the liquid surface of the analysis target sample (test solution), the pressure in the second syringe 40 changes slightly, and therefore the liquid surface position of the analysis target sample (test solution) is specified due to the slight change in pressure being detected by the pressure detection unit 95.

Note that when detecting the liquid surface, it is preferable to minimize dead volume by keeping the inner capacity of the first syringe 30 at a minimum in order to increase the detection sensitivity of the pressure detection unit 95.

Suction of Analysis Target Sample

When the analysis target sample is to be suctioned, the moving mechanism 210 is operated in the Z direction (vertical direction), the first driving unit 80 and the second driving unit 90 of the pipette device 100 are driven in a synchronized manner while the leading end of the disposable tip 72 is immersed in the analysis target sample (test solution), and thus the first syringe 30 and the second syringe 40 are operated in the suction direction.

After suctioning a predetermined amount of the analysis target sample (test solution) into the disposable tip 72, the first driving unit 80 and the second driving unit 90 of the pipette device 100 are stopped. Thereafter, the moving mechanism 210 is operated in the +Z direction (vertically upward direction) to raise the pipette device 100 to a predetermined height and withdraw the pipette device 100 from the tip attachment position P1.

Dispensing (Discharge) Operation

If the dispensing (discharge) operation is to be performed, the moving mechanism 210 is operated in the XY direction (horizontal direction), the pipette device 100 is moved above a test reagent container P3, and then the moving mechanism 210 is moved in the −Z direction (vertically downward direction) to lower the pipette device 100 to a predetermined height. The first driving unit 80 and the second driving unit 90 of the pipette device 100 are driven in a synchronized manner according to the dispensing amount, and the analysis target sample (test solution) suctioned into the disposable tip 72 is discharged to the test reagent container P3.

When the suctioned analysis target sample (test solution) is to be discharged to a plurality of test reagent containers P3, movement performed by the movement mechanism 210 and discharge performed by the pipette device 100 are repeatedly implemented with respect to each test reagent container P3. After the analysis target sample (test solution) is discharged into a predetermined number of test reagent containers P3, all of the surplus analysis target sample (test solution) in the disposable tip 72 is discharged at a disposal position and discarded.

Detachment of Disposable Tip

When the dispensing operation ends, the disposable tip 72 is detached. The movement mechanism 210 is operated in the XY direction (horizontal direction) to move the pipette device 100 above a tip detachment position P4, and the first driving unit 80 and the second driving unit 90 of the pipette device 100 are driven to cause a transition to a state where the inner capacity of the first syringe 30 is at a maximum and the inner capacity of the second syringe 40 is at a minimum (FIG. 9). By raising the leading end of the nozzle 70 and bringing the disposable tip 72 into contact with the tip detachment portion 74, the disposable tip 72 can be detached from the leading end of the nozzle 70. The detached disposable tip 72 is discarded as a used tip at the tip detachment position P4.

End of Dispensing (Discharge) Operation

When the disposable tip detachment operation ends, the dispensing (discharge) operation is ended. The moving mechanism 210 is operated in the XY direction (horizontal direction) and the Z direction to move the pipette device 100 to a predetermined position. The first driving unit 80 and the second driving unit 90 of the pipette device 100 are driven to cause the pipette device 100 to stand by in the state of the set initial position.

Modified Example

Although embodiments of the present invention have been described above, the above-described embodiments are merely examples for carrying out the present invention. Thus, the present invention is not limited to the above-described embodiments, and the above-described embodiments can be modified as appropriate and implemented without deviating from the gist thereof.

For example, the shape and arrangement of each member included in the pipette device 100 are not limited to those of the embodiment. For example, in the present embodiment, the inner diameters of the first syringe barrel 31 and the second syringe barrel 41 were substantially the same, but they may be different.

INDUSTRIAL APPLICABILITY

The present invention is applicable to a pipette device for suctioning and discharging a fluid such as a test solution.

LIST OF REFERENCE NUMERALS

100 Pipette device
30 First cylinder
40 Second cylinder
60 Flow path
70 Nozzle
80 First driving unit
90 Second driving unit

The invention claimed is:
1. A pipette device comprising:
a first syringe that is configured to suctioning fluid and is configured to discharge fluid with a predetermined dispensing precision of fluid discharge amount discharge precision; wherein
the first syringe comprises:
 a first syringe barrel; and
 a first plunger that is arranged inside of the first syringe barrel and is configured to move forward and backward relative to the first syringe barrel:
a second syringe that is configured to suction fluid and discharging fluid with a higher dispensing precision of fluid discharge amount than the first syringe; wherein
the second syringe comprises:
 a second syringe barrel,
 a second plunger that is arranged inside of the second syringe barrel and is configured to move forward and backward relative to the second syringe barrel,
 an insertion portion that is arranged inside of the second syringe barrel and forms a gap with an inner surface of the second syringe barrel, the gap serving as a storage space for storing fluid,
 a pressure measurement flow path is formed inside of the second plunger and is in communication with the inside of the second syringe barrel;
 a pressure detection unit configured to detect a pressure of fluid in the pressure measurement flow path, and the pressure detection unit is coaxial with the second plunger;
wherein the insertion portion is formed in one piece with the second plunger and moves forward and backward relative thereto,
wherein the second plunger suctions fluid in the gap and discharges fluid stored in the gap by moving forward and backward relative to the second syringe barrel:
wherein the second plunger is formed with the insertion portion on a first end side thereof, and a second end side opposite to the first end side is fixed to the casing via a fixing portion; and
wherein the first syringe barrel and the second syringe barrel are capable of configured to move forward and backward in a synchronized manner with respect to the first plunger and the second plunger;
wherein the first syringe barrel and the second syringe barrel are provided in a shared syringe base;
a nozzle provided in common to the first syringe and the second syringe;
a flow path that causes the first syringe and the second syringe to be in communication with each other, and is in communication with the nozzle; and
a driving unit configured to drive the first syringe and the second syringe such that the first syringe and the second syringe suction and discharge fluid from the nozzle individually or in cooperation with each other,
the driving unit comprising:
 a cylinder driving unit configured to drive the first syringe barrel and the second syringe barrel in a synchronized manner, the cylinder driving unit moving the first syringe barrel and the second syringe barrel forward and backward with respect to the first plunger and the second plunger by moving the syringe base forward and backward, and
 a plunger driving unit configured to drive the first plunger forward and backward with respect to the corresponding first syringe barrel,
wherein:
 the plunger driving unit is configured to move the first plunger forward and backward with respect to the first cylinder, the second plunger is fixed and does not move,
 the second syringe performs suction and discharge of fluid due to the second syringe barrel provided in the syringe base moving forward and backward with respect to the second plunger; and
a control unit configured to drive and control the first driving unit and the second driving unit so that the first syringe and the second syringe suction and discharge the fluid individually or in cooperation with each other.

* * * * *